Jan. 13, 1959    C. G. MEYER    2,867,962
ROW CROP ATTACHMENT FOR COMBINES
Filed Jan. 10, 1958    2 Sheets-Sheet 1

INVENTOR.
Cyril G. Meyer
BY
Merchant & Merchant
ATTORNEYS

Jan. 13, 1959 C. G. MEYER 2,867,962
ROW CROP ATTACHMENT FOR COMBINES
Filed Jan. 10, 1958 2 Sheets-Sheet 2
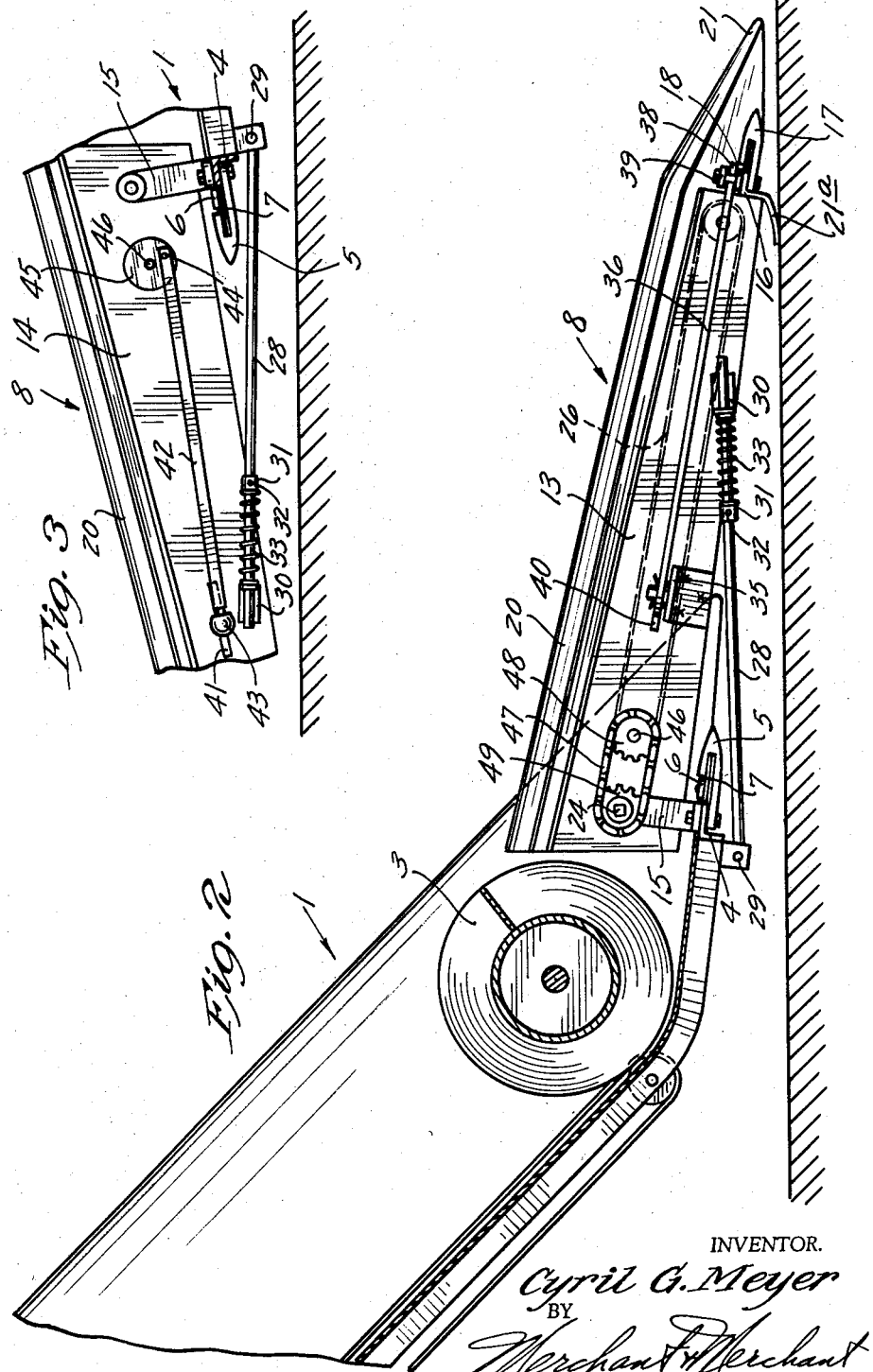
INVENTOR.
Cyril G. Meyer
BY
Merchant & Merchant
ATTORNEYS United States Patent Office 2,867,962
Patented Jan. 13, 1959

2,867,962
ROW CROP ATTACHMENT FOR COMBINES
Cyril G. Meyer, Wahpeton, N. Dak.
Application January 10, 1958, Serial No. 708,198
1 Claim. (Cl. 56—158)

My invention relates to attachments for conventional combine type harvesting machines.

Such conventional combines are primarily designed to harvest broadcast crops as distinguished from row crops and hence cut a relatively wide swath. Consequently, as one attempts to harvest row crops with such a machine, the weeds between the rows are harvested and intermingled with the row crop being harvested.

The primary object of my invention is the provision of a novel attachment for wide swath cutting combines by which such combines may be converted into a relatively narrow swath cutting harvesting machine for row crops such as soy beans and the like.

A further object of my invention is the provision of a device of the class described which may be easily attached to and detached from a conventional combine with a minimum of time, labor and experience.

A further object of my invention is the provision of a device of the class immediately above described which is efficient in its operation and has a minimum of working parts and is rugged and durable.

A still further object of my invention is the provision of a device of the class above described which is relatively inexpensive to produce and which is light in weight and relatively easy to handle.

The above and still further objects of my invention will become apparent from the following detailed specification, appended claims and attached drawings.

Referring to the drawings wherein like characters indicate like parts throughout the several views:

Fig. 2 is a view partly in section and partly in side elevation as seen substantially from the line 2—2 of Fig. 1; and Fig. 3 is a fragmentary view partly in section and partly in side elevation as seen substantially from the line 3—3 of Fig. 1.

Figure 1:
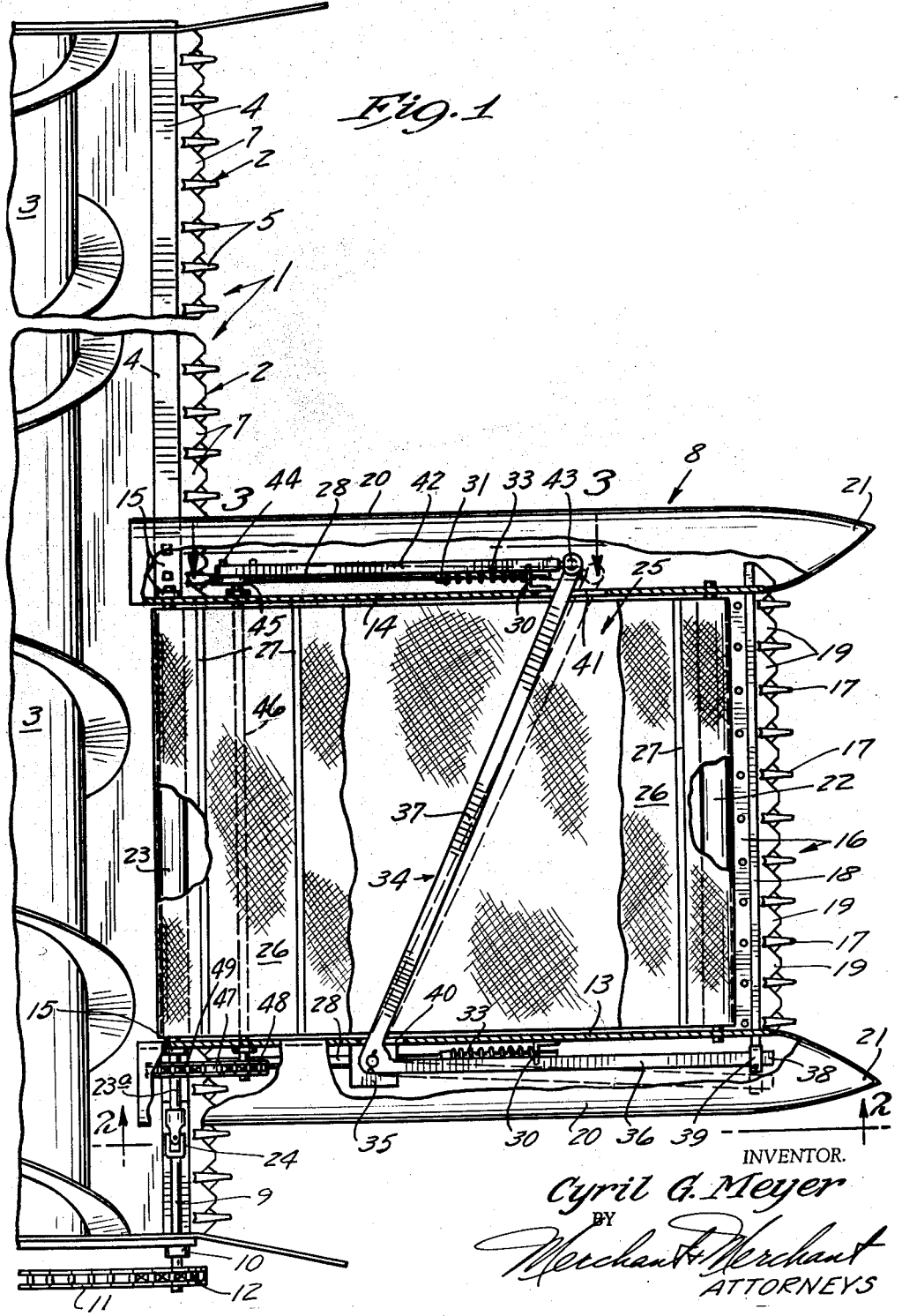
Fig. 1 is a fragmentary view in top plan of a conventional combine showing my novel attachment thereon, some parts being broken away and some parts shown in section.

Referring with greater particularity to the drawings, the numeral 1 indicates in its entirety the front end portion of a conventional combine having a sickle 2 mounted transversely across the leading edge portion thereof and a screw conveyor 3 located immediately rearwardly of the sickle 2 and generally parallel thereto. The sickle 2 comprises a sickle bar 4 to which are secured a plurality of laterally spaced forwardly projecting guards 5 on which are mounted for reciprocation a cutter bar 6 having a plurality of cutter blades 7 secured thereto in side by side relationship.

My novel attachment, identified in its entirety by the numeral 8, derives its power through the medium of a drive shaft 9 journaled for rotation on the forward end portion of a frame member 10 of the combine 1. An endless chain or the like 11 is entrained over a sprocket 12 on the drive shaft 9 and may be assumed to be entrained on a driving sprocket, not shown, but associated with the driving mechanism of the combine 1. The drive shaft 9 and associated parts, not being standard equipment in the conventional combine, must be attached thereto.

My novel attachment 8 comprises a frame including a pair of spaced forwardly extending side frame members 13 and 14 which are detachably securable to the sickle 2 at their rear ends by means of angle brackets or the like 15 for pivotal swinging movements on the horizontal axis of the drive shaft 9. At their front ends, the side frame members 13 and 14 are rigidly connected by a sickle bar 16, preferably made from angle iron or the like and having associated therewith a plurality of mower guards 17 upon which is mounted for reciprocation a cutter bar 18 having mounted thereon the conventional cutter blades 19. All in a conventional manner, the side frame members 13 and 14 are cased within elongated boots 20 defining relatively pointed gathering elements 21 at their forward ends, which are supported by skids or shoes 21a.

Front and rear conveyor supporting rollers 22 and 23 respectively are journaled in the front and rear ends of the side frame members 13 and 14 on parallel horizontal axes, the latter thereof being substantially aligned with the drive shaft 9 associated with the driving mechanism of the combine 1, and connected thereto by a universal joint 24. An endless conveyor belt 25 is entrained over the rollers 22 and 23, the top flight 26 thereof being driven in a direction to deliver material rearwardly to the combine 1 and particularly to the conveyor 3 thereof. The conveyor belt 25 is preferably made from canvas or the like and is preferably provided with transverse slats or the like 27.

For supporting the attachment 8, I provide a pair of laterally spaced parallel supporting arms 28 that are pivotally secured to brackets 29 depending from the front end portion of the combine 1 below the sickle 2 thereof, for swinging movements on a common horizontal axis extending transversely of the combine 1. The front ends of the supporting arms 28 are longitudinally slidably mounted in bracket elements 30 rigidly secured to the side frame members 13 and 14 forwardly and below the pivotal connection of the side frame members to their supporting brackets 15. Intermediate the brackets 29 and bracket elements 30, the supporting arms 28 are provided with longitudinally adjustable stop collars 31 preferably provided with set screws or the like 32 by means of which the stop collars 31 may be releasably locked in desired set positions on their respective arms 28. Coil compression springs 33 are mounted one each on one of the supporting arms 28 between their respective bracket elements 30 and stop collars 31 to yieldingly urge the front end portion of the attachment 8 upwardly against the action of gravity, to yieldably hold the front end of the attachment 8 in predetermined spaced relation to the ground.

For the purpose of imparting reciprocating movements to the blade-equipped cutter bar 18 of my novel attachment, a bell crank lever, identified in its entirety by the numeral 34, is pivotally secured on a vertical axis at its intermediate portion to a mounting plate 35 rigidly carried by the side frame member 13. The bell crank lever 34 includes a pair of arms 36 and 37, the former of which extends generally forwardly of its pivotal connection to the mounting plate 35, and has its extreme forward end 38 operatively coupled to the adjacent end of the cutter bar 18. It will be noted that said adjacent end of the cutter bar 18 is provided with a retaining fork or clevis 39 which loosely couples the front end 38 of the lever arm 36 to the cutter bar 18. The arm 37 of the bell crank lever 34 extends angularly through a pair of elongated openings or slots 40 and 41 in the side frame members 13 and 14 respectively intermediate the upper and lower flights of the conveyor belt 25, as shown particularly in Fig. 2, and has its outer end pivotally connected to the forward end of a pitman arm 42 disposed in spaced parallel relation to the adjacent side frame member 14, the pivotal connection between the lever arm 37 and the pitman arm 42 being in the nature of a ball and socket joint 43. At its rear end, the pitman arm 42 is pivotally connected to a crank pin 44 extending laterally outwardly from a crank element 45 rigidly secured to a crank shaft 46 journaled in the side frame members 13 and 14 in spaced substantially parallel relation to the rear conveyor roller 23. As shown in Fig. 1, the conveyor roller 23 is provided with a shaft 23a by means of which the conveyor roller is coupled to the universal joint 24. Driving connections between the shaft 23a and the crank shaft 46 comprise an endless link chain 47 that is entrained over a pair of cooperating sprocket wheels 48 and 49 respectively rigidly secured to the crank shaft 46 and shaft portion 23a respectively.

It should be obvious that more than one of my novel attachments can be attached to the same combine in laterally spaced relation and used at the same time to harvest two rows of crops—this even though the two crops are on specifically different levels. This can be done, of course, because the shoes 21a associated with each of the attachments 8 guide their respective attachment at the proper height for the row being harvested by each thereof.

My invention has been thoroughly tested and found to be completely satisfactory for the accomplishment of the above objects and while I have shown a preferred embodiment thereof, I wish it to be understood that same is capable of modification without departure from the scope and spirit of the appended claim.

What I claim is:

A row crop harvesting attachment for sickle-equipped harvesting combines, said attachment comprising a pair of laterally spaced side frame members adapted to be detachably secured to the sickle of said combine to project forwardly thereof in parallel relationship, a sickle bar connecting the front end portions of said frame members, a cooperating cutter-equipped mower bar mounted for reciprocating movements on said sickle bar, an endless conveyor belt mounted between said frame members for conveying material from said sickle bar to said harvesting combine, means associated with said frame members for imparting conveying movements to said conveyor belt and including a drive shaft adapted to be operatively coupled to said harvesting machine to be rotated thereby, and means for imparting reciprocatory movement to said mower bar, said means comprising a crank operatively connected to said drive shaft, a bell crank lever pivotally secured on a vertical axis to one of said side frame members intermediate said drive shaft and said mower bar, one arm of said bell crank extending generally longitudinally of said frame member and coupled at its forward end to one end portion of said mower bar, the other arm of said bell crank lever extending between the flights of said conveyor belt through slots in said frame members, and a pitman arm pivotally connected at one end to the extended end of said other arm and at its other end to said crank.

References Cited in the file of this patent

UNITED STATES PATENTS

| | | |
|---|---|---|
| 2,316,475 | Viken | Apr. 13, 1943 |
| 2,359,409 | Dray | Oct. 3, 1944 |
| 2,575,120 | Peel | Nov. 13, 1951 |
| 2,630,664 | Hansen | Mar. 10, 1953 |
| 2,716,481 | Dray | Aug. 30, 1955 |
| 2,765,612 | Raumaker et al. | Oct. 9, 1956 |